United States Patent [19]

Kuhn, Jr. et al.

[11] Patent Number: 5,530,509
[45] Date of Patent: Jun. 25, 1996

[54] CAMERA WITH DOOR FOR MOVING A CARTRIDGE INTO A LOADING CHAMBER

[75] Inventors: Robert L. Kuhn, Jr., Rush; Beth A. O'Leary, Rochester, both of N.Y.

[73] Assignee: Eastman Kodak Company, Rochester, N.Y.

[21] Appl. No.: 453,155

[22] Filed: May 30, 1995

[51] Int. Cl.$^6$ .......................... G03B 1/00; G03B 17/26; G03B 17/02
[52] U.S. Cl. .......................... 354/212; 354/275; 354/288
[58] Field of Search .................................. 354/288, 275, 354/173.1, 212

[56] References Cited

U.S. PATENT DOCUMENTS

| | | | |
|---|---|---|---|
| 3,481,261 | 12/1969 | Fischer et al. | 354/173.1 |
| 4,318,603 | 3/1982 | Daitoku et al. | 354/214 |
| 4,324,470 | 4/1982 | Terunuma | 354/214 |
| 4,963,905 | 10/1990 | Haraguchi et al. | 354/152 |
| 4,994,828 | 2/1991 | Smart | 354/21 |
| 5,142,316 | 8/1992 | Tanii et al. | 354/212 |
| 5,255,034 | 10/1993 | Shimada et al. | 354/173.1 |
| 5,307,101 | 4/1994 | Tanii et al. | 354/173.1 |
| 5,347,332 | 9/1994 | Wakabayashi | 354/173.1 |
| 5,351,102 | 9/1994 | Tsuji et al. | 354/106 |
| 5,359,378 | 10/1994 | Zander et al. | 354/275 |
| 5,422,695 | 6/1995 | Katagiri | 354/173.1 |

*Primary Examiner*—Michael L. Gellner
*Assistant Examiner*—Eddie C. Lee
*Attorney, Agent, or Firm*—David A. Howley

[57] ABSTRACT

A camera includes a chamber for receiving a cartridge having a shell and a film spool, substantially concealed inside the shell, with exposed axial spool ends. The camera further includes a spindle for supporting a first one of the exposed spool ends, and a pivotal door with a spring-urged bushing for pushing against a second one of the exposed spool ends for urging the first exposed spool end onto the spindle when the door is pivoted closed. The invention is characterized by a rigid member of the pivotal door for pushing against the shell, but not against the second exposed spool end, to move the cartridge initially into the chamber toward the spindle before the spring-urged member can push against the second exposed spool end when the door is pivoted closed.

9 Claims, 5 Drawing Sheets

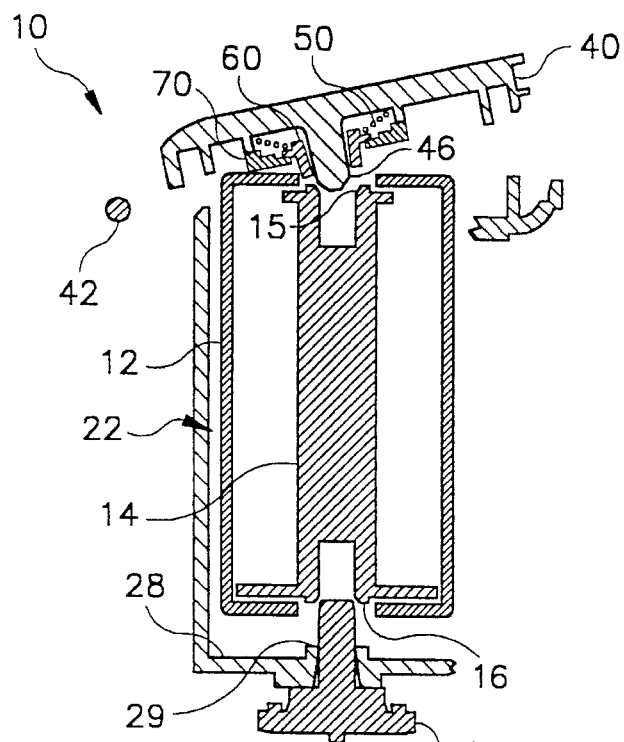
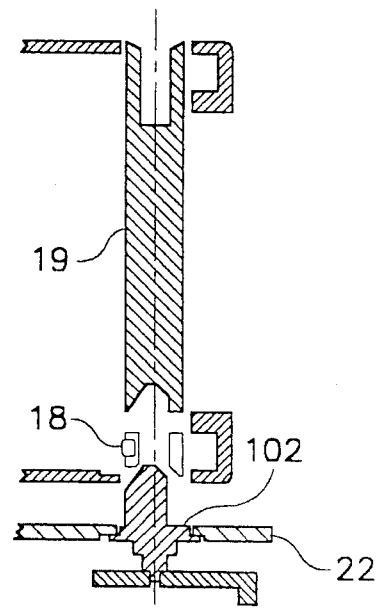
FIG. 3A
FIG. 3B
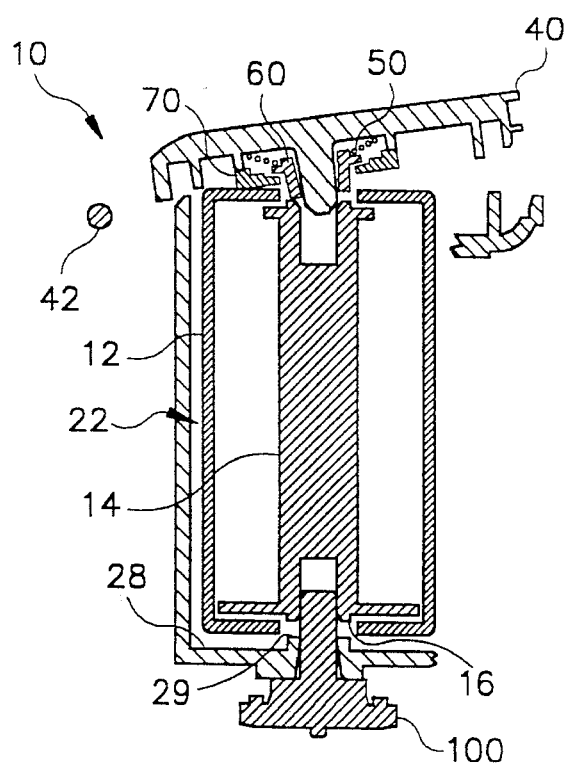
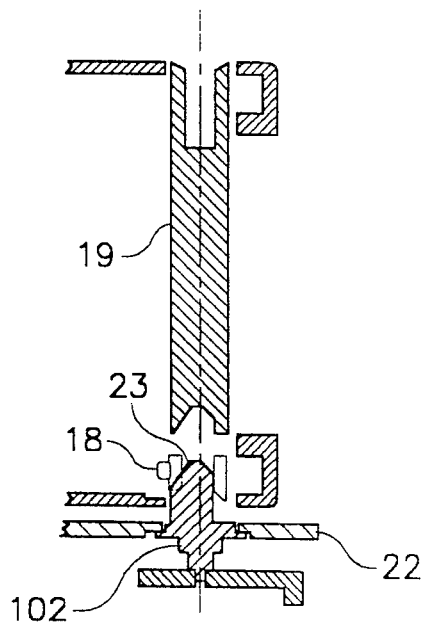
FIG. 4A
FIG. 4B

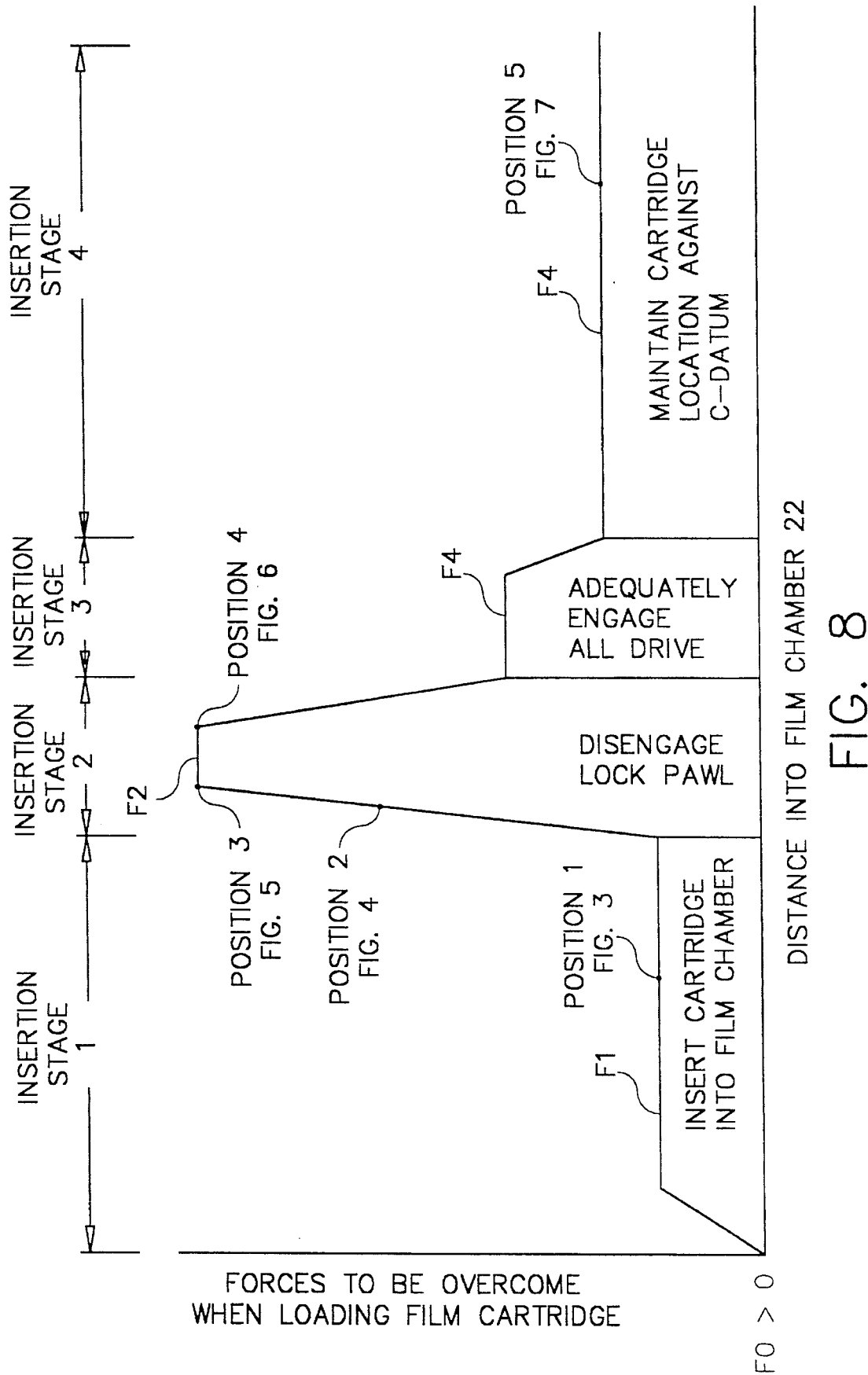

1

CAMERA WITH DOOR FOR MOVING A CARTRIDGE INTO A LOADING CHAMBER

FIELD OF THE INVENTION

The invention relates generally to the field of photography, and in particular to cameras. More specifically, the invention relates to a camera with a door for moving a cartridge into a loading chamber.

BACKGROUND OF THE INVENTION

When a film cartridge is loaded into a camera, it is necessary to insure that the film cartridge is firmly located in a known position to insure proper camera operation. In addition, several operations may occur during the cartridge loading sequence that require camera features to engage film cartridge features. For example, in one camera system, a double exposure protection sensor or hook engages the film cartridge to insure only unexposed film cartridges are loaded into the camera (see e.g. U.S. Pat. No. 4,994,828).

Another operation which can occur during film cartridge loading is the engagement of a camera light lock drive mechanism with an active light lock (ALL) of the film cartridge. The ALL on the cartridge is movable by the drive mechanism between an open position, allowing photographic film to exit the cartridge, and a closed position sealing the cartridge in a light-tight manner. The ALL door of the film cartridge is normally held closed by a lock pawl on the film cartridge. When a film cartridge is loaded into a camera loading chamber or other equipment (e.g. photofinishing apparatus), the lock pawl must be disengaged from the ALL in order to open the ALL door so that film can be thrust from the film cartridge. The loading force required to disengage the lock pawl from the ALL is the largest of all the loading forces which must be provided to the film cartridge during loading of the cartridge into the loading chamber. Other lesser loading forces must also be applied to the cartridge during loading.

One method for loading a film cartridge into a camera provides for a single loading force which is larger than the largest force experienced by the film cartridge during loading. As described in the camera system above, the lock pawl disengagement force is the largest resistance that must be overcome during cartridge loading. In this loading method, the camera user pushes the film cartridge partially into the camera loading chamber and then closes a film door. The user then pushes the film door towards a closed position causing the door to engage the cartridge to push the film cartridge the rest of the way into the camera chamber.

Using this loading method, camera film doors are typically designed to withstand the maximum force required to load a film cartridge into a camera when the film door is closed. This results in film doors that have large spring mechanisms for closing the door, and significantly thick cross-sections. Such film doors, are harder for the user to close, weigh more than is desired and have larger space requirements than is desired for use in small, light weight cameras. It is therefore desired to have a film door that is light weight, has a minimum volume and requires a minimum spring force to properly locate a film cartridge.

U.S. Pat. No. 5,255,034 discloses a camera in which a guide member support shaft is fixed to a cover in an internal central portion of the cover. A guide member is provided rotatably around the support shaft and is actuated downward by a spring to engage with a not-projecting cylindrical patrone shaft. The guide member regulates the position of the film patrone in an axial direction. The surface of the guide member engaging with the patrone shaft is a conical surface which causes the film patrone to be eccentric with respect to the patrone chamber by means of the spring. Such disclosure does not provide any feature on the cover for pushing the patrone into the chamber to overcome resistance forces to patrone loading prior to the guide member engaging the patrone shaft. As such, the spring will have to provide a much higher loading force than is necessary to load the patrone into the chamber.

SUMMARY OF THE INVENTION

The present invention is directed to overcoming one or more of the problems set forth above. Briefly summarized, according to one aspect of the present invention, a camera includes a chamber for receiving a cartridge having a shell and a film spool, substantially concealed inside the shell, with exposed axial spool ends. The camera further includes a spindle for supporting a first one of the exposed spool ends, and a pivotal door with a spring-urged member for pushing against a second one of the exposed spool ends for urging the first exposed spool end onto the spindle when the door is pivoted closed. The invention is characterized by a rigid member of the pivotal door for pushing against the shell, but not against the second exposed spool end, to move the cartridge initially into the chamber toward the spindle before the spring-urged member can push against the second exposed spool end when the door is pivoted closed.

As such, the rigid member pushes against the shell to overcome the highest loading force resistance on the cartridge prior to the spring-urged member pushing against the spool to urge the spool onto the spindle. Therefore, the spring-urged member can be designed to place a force on the spool which is smaller than the largest loading force.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIGS. 3–7 are side sectional views of the camera of FIG. 1 with the cartridge of FIG. 2 in various loading positions; and FIG. 8 is a plot of cartridge loading force verses distance into film chamber that the cartridge is loaded.

DETAILED DESCRIPTION OF THE INVENTION

Figure 1:
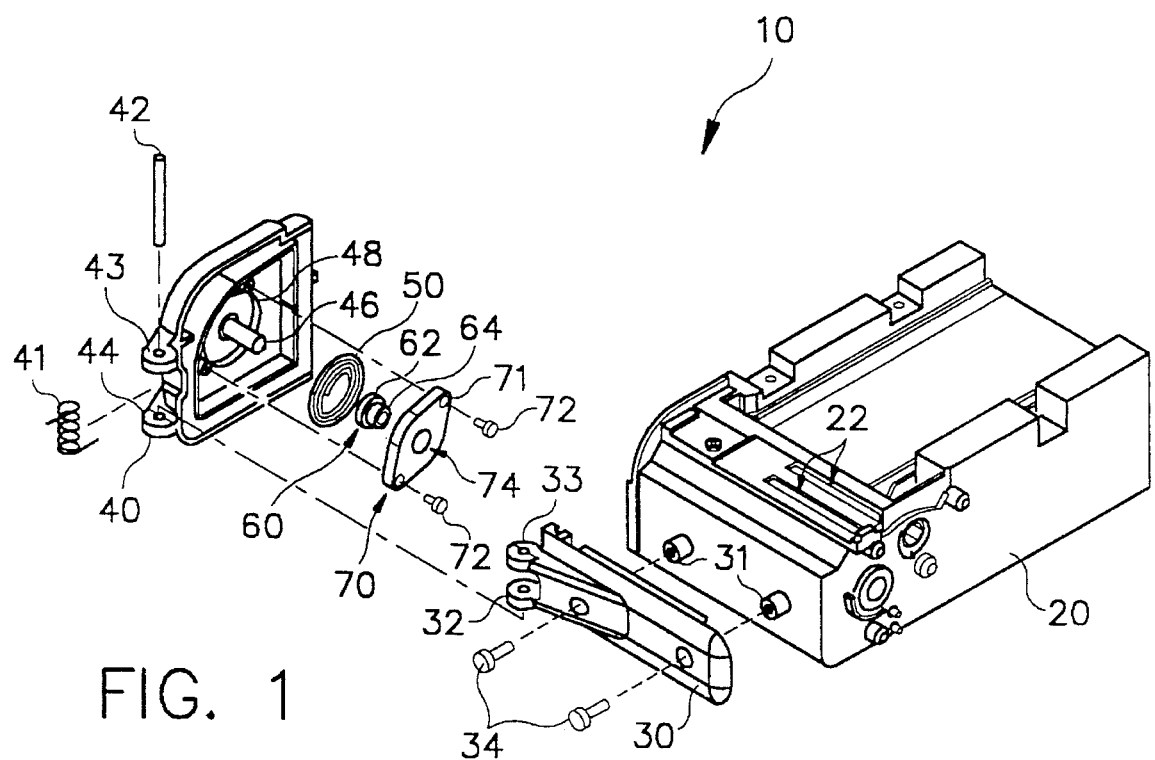
FIG. 1 is an exploded perspective view of a portion of a camera incorporating the present invention.

FIG. 1 shows an exploded perspective view of a camera 10 having a body 20. A film chamber 22 holds a film cartridge when it is loaded in camera 10. A hinge 30 is attached to one end of body 20 at holes 31 by a pair of fasteners 34. The hinge includes a pair of hinge arms 32, 33. A film door 40 includes first and second film door arms 43, 44 which engage first and second hinge arms 32, 33 when assembled. A film door pin 42 passes through these arms 32, 33, 43, 44 to hold film door 40 to hinge 30. Film door pin 42 also captures a film door spring 41 which urges film door 40 toward an open position. Film door 40 also includes a spool engaging post 46 which engages a spool in a film cartridge.

A conical spring 50, which has the shape of a truncated cone, and a bushing 60, which is basically T-shaped, are held against film door 40 by a retainer 70. Retainer 70 is secured to door 40 by a pair of fasteners 72. Bushing 60 includes a bushing flange 62 which has a larger outer diameter than a bushing barrel 64. Retainer 70 includes a retainer face 71 and a retainer aperture 74 which is large enough to receive barrel 64 but smaller than bushing flange 62. A spring retaining lip 48 in door 40 helps position conical spring 50 when installed. When assembled, the larger end of conical spring 50 is seated against film door 40 inside spring retaining lip 48. Bushing flange 62 presses against the smaller end of conical spring 50, and bushing barrel 64 protrudes through retainer aperture 74 in retainer 70. Thus, retainer 70, when attached to film door 40, holds conical spring 50 and bushing 60 in movable position around spool engaging post 46.

Figure 2:
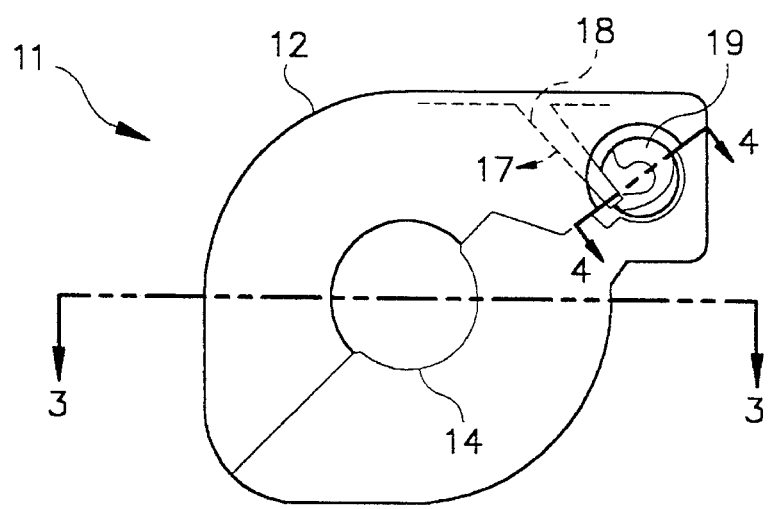
FIG. 2 is an end view of a photographic-film cartridge usable with the camera of FIG. 1.
Figure 5A:
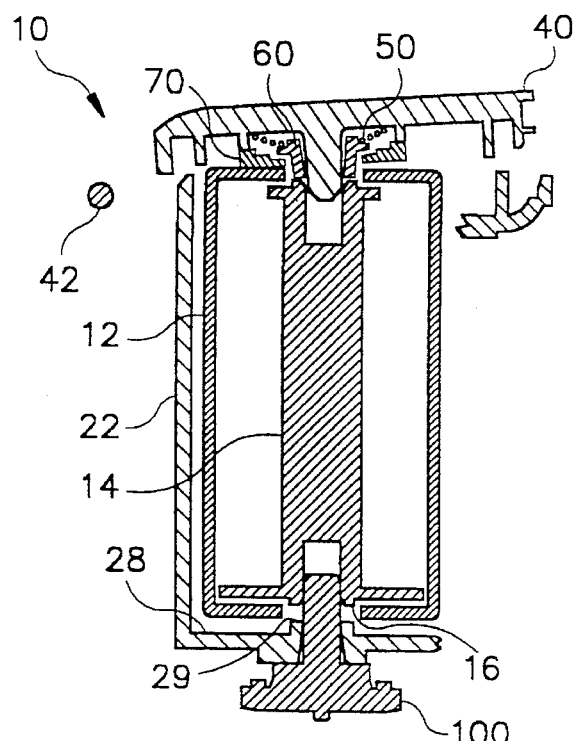
Figure 5B:
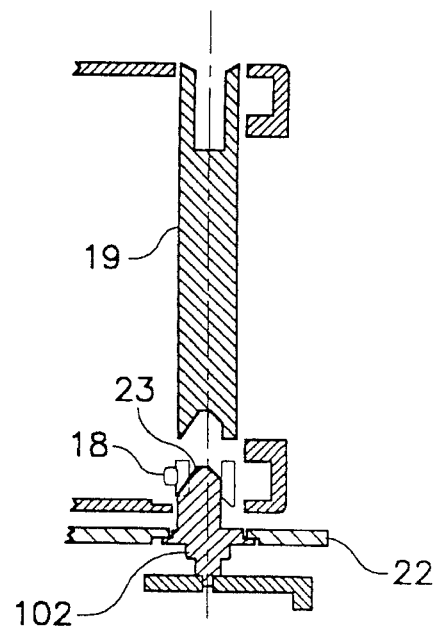

FIG. 2 discloses an end view of a film cartridge designated generally by the reference numeral 11. An example of such a film cartridge is disclosed in U.S. Pat. No. 5,359,37:8 (the '378 patent) which is incorporated herein by reference. Cartridge 11 is usable with camera 10 and includes a shell 12 and a film spool 14 supported for rotation within the shell. The film spool has axial ends which are exposed through shell 12. A light lock (light blocking means) 19 is rotateable between an open position, allowing a photographic filmstrip to protrude from the shell, and a closed position sealing the shell in a light-tight manner. A locking pawl 18 secures the light lock in its closed position but can be displaced (flexed) in the direction of an arrow 17, as a light lock driver engages the light lock, to allow the light lock to be rotated clockwise to its open position.

Cross section views of film cartridge 11 during insertion into film chamber 22 are provided in FIGS. 3 through 7. The location of these cross sections is shown in FIG. 2. Specifically, cross section A—A is a view through the center of the film cartridge 11 while cross section B—B is a view through the center of the ALL door 19. Cross section B—B is at an angle to cross section A—A.

Turning to FIG. 3, a camera user first inserts film cartridge 11 part way into film chamber 22 and then begins to close door 40. As the film door 40 is moved towards a closed position, retainer 70 pushes against shell 12 of film cartridge 11 to begin to push the film cartridge further into chamber 22. Thus, a first loading force is supplied by retainer 70 engaging shell 12 of film cartridge 11. Film door 40 and retainer 70 are sized appropriately to operate as desired without warping or twisting while applying the first loading force to the film cartridge. Notice that at this point in time, bushing 60 has not engaged spool 14, and thus conical spring 50 pushes bushing 60 until bushing 60 engages an inner surface of retainer 70. Also notice that film cartridge 12 in this example has not yet engaged a film drive 100 located in the bottom of film chamber 22. Further, lock pawl 18 holds ALL door 19 closed, and an ALL drive 102 has not yet engaged lock pawl 18 or ALL door 19.

Referring to FIG. 4, as film door 40 continues to push film cartridge 11 into film chamber 22, a second position in the loading sequence occurs in which a cam surface 23 on ALL drive 102 engages lock pawl 18 and begins to push lock pawl 18 out of engagement with ALL door 19. A short time later a third position in the loading sequence occurs (FIG. 5) in which the ALL drive 102 has disengaged lock pawl 18 from ALL door 19, and lock pawl 18 now contacts the side of ALL drive 102.

Figure 6A:
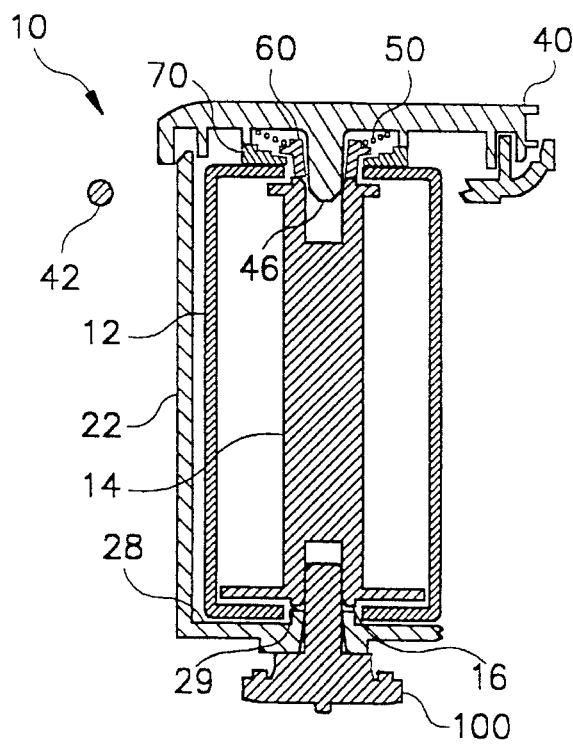
Figure 6B:
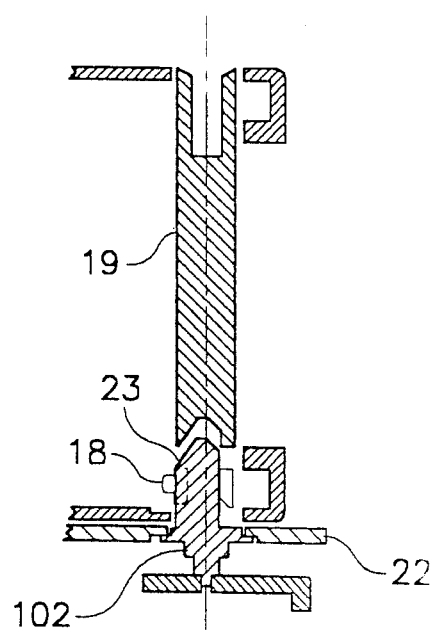

FIG. 6 shows the film door 40 completely closed. In this fourth position in the loading sequence the film door 40 is closed although film cartridge 11 may not yet be completely located in the film chamber 22. At this point in time, the face 72 of retainer 70 makes essentially full contact with the film cartridge 11, applying a first loading force sufficient to overcome the resistance force required to disengage the locking pawl. The distance that retainer 70 extends into film chamber 22 is sometimes referred to as the stack height of retainer 70. The stack height must be sufficient to push film cartridge 12 into film chamber 22 so that lock pawl 18 is moved to an unlocked position from door 19. A spool engaging post 46 (sometimes referred to as the B-datum) has engaged spool 14 and bushing 60 has engaged first spool end surface 15 (see FIG. 3). Bushing 60 has been lifted off of the inner surface of retainer 70 due to its contact with first spool end surface 15, and this has caused conical spring 50 to compress, adding a second loading force on the spool which is communicated to film cartridge 11.

Notice that at this point in time, film cartridge 11 has not fully moved into film chamber 22 and that film drive 100 has engaged an end of spool 14. Also, second spool end surface 16 has not yet engaged a camera-spool interface surface 29 (also known as the C-datum). Lock pawl 18 has moved along the side of ALL drive 102, although ALL drive 102 has not fully engaged ALL door 19 in this fourth position.

Figure 7A:
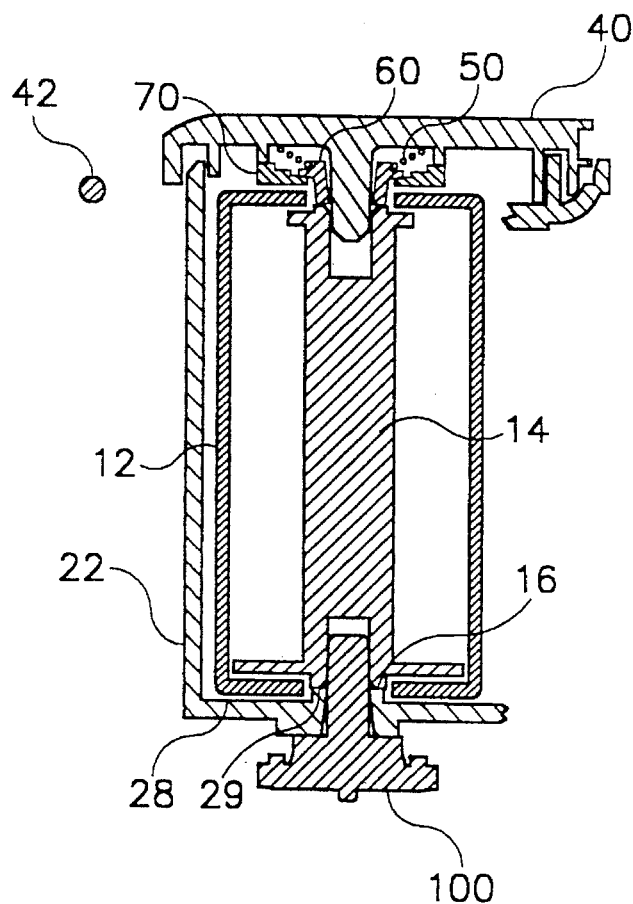
Figure 7B:
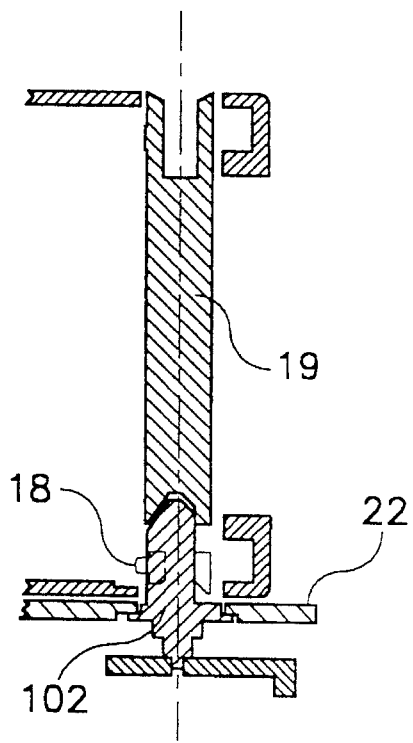

FIG. 7 shows the film cartridge 11 in a fifth position in the loading sequence; i.e. fully loaded into film chamber 22. The first loading force of the film door 40 and retainer 70 has moved the film cartridge substantially into film chamber 22. Conical spring 50 supplies the second loading force of the film door which presses bushing 60 into spool 14 insuring contact between second spool end surface 16 and camera-spool interface surface 29, thereby fully loading cartridge 11 into chamber 22. This second loading force from conical spring 50 on spool 14 is sufficient to overcome forces F3 and provide F4 (see FIG. 8). ALL drive 102 has fully engaged ALL door 19 in this fifth position, and lock pawl 18 remains in contact with the side of ALL drive 102.

FIG. 8 shows a schematic representation of a typical force-position profile for a film cartridge 11 being loaded into a camera 10. The forces experienced by film cartridge 11 as it is being loaded into a camera 10 vary with the distance the film cartridge 12 has moved into the camera 10. During a first insertion stage, as a film cartridge 11 is initially inserted into a film chamber 22 of camera 10, forces on film cartridge 11 rise from zero to a first loading force value F1. Force F1 may be due to resistance from a spring loaded ejection mechanism (not shown) used to eject the film cartridge from the loading chamber or from other forces such as frictional forces between other camera components and shell 12. As the film cartridge 11 progresses further into film chamber 22, forces on the film cartridge 11 increase (as shown in insertion stage 2) to a second loading force value F2. The force F2 is primarily the result of the ejection mechanism and disengaging the locking pawl of the film cartridge 11, but other forces may also be present from sensors or other features that engage film cartridge 11 as it moves into film chamber 22, such as initial engagement of film drive 100 with the cartridge spool.

Once the lock pawl 18 on film cartridge 11 has been disengaged, the film cartridge 11 experiences another force F3 as the ALL drive 102 fully engages the ALL door 19 during insertion stage 3. The ALL drive 102 must fully engage the ALL door 19 in order to open the ALL door 19; partial engagement may not open the ALL door 19 properly or completely, resulting in failure to load film or damage to film as it moves out of film cartridge 11.

Insertion stage 4 is the final portion of the force profile during which a minimum force F4 must be applied to spool 14 of film cartridge 11 in order to maintain spool 14 in proper location for camera operation. In this example, spool 14 must be maintained in contact with the C-datum of the film chamber 22.

Notice that the greatest force F2 which film cartridge 11 experiences during loading occurs for a limited period of time, and that force F2 occurs in the central portion of the loading sequence. Thereafter, film cartridge 11 experiences significantly lower forces for the remainder of the loading sequence. Typical cameras are designed to provide a single force during the entire loading sequence which is sufficient to overcome force F2. The present invention provides a cartridge loading apparatus that provides sufficient force to film cartridge 12 to overcome F2 during the time F2 is present, following which the apparatus provides another force to spool 14 that is sufficient to overcome lower force F3 and supply F4 as required.

The invention has been described with reference to a preferred embodiment. However, it will be appreciated that variations and modifications can be effected by a person of ordinary skill in the art without departing from the scope of the invention.

PARTS LIST

| | |
|---|---|
| 10 | camera |
| 11 | film cartridge |
| 12 | shell |
| 14 | spool |
| 15 | first spool end surface |
| 16 | second spool end surface |
| 18 | lock pawl |
| 19 | ALL door |
| 20 | body |
| 22 | film chamber |
| 28 | base of film chamber |
| 29 | camera-spool interface surface (C-datum) |
| 30 | hinge |
| 31 | holes |
| 32 | first hinge arm |
| 33 | second hinge arm |
| 34 | fasteners |
| 40 | film door |
| 41 | film door spring |
| 42 | film door pin |
| 43 | first film door arm |
| 44 | second film door arm |
| 46 | spool engaging post (B-datum) |
| 48 | spring retaining lip |
| 50 | conical spring |
| 60 | bushing |
| 62 | bushing flange |
| 64 | bushing barrel |
| 70 | retainer |
| 71 | retainer face |
| 72 | fasteners |
| 74 | retainer aperture |
| 100 | film drive |
| 102 | ALL drive 102 |
| F1 | first loading force value |
| F2 | second loading force value |
| F3 | third force value |
| F4 | fourth force value |

We claim:

1. A camera comprising a chamber for receiving a cartridge having a shell and a film spool, substantially concealed inside the shell, with exposed axial spool ends, a spindle for supporting a first one of the exposed spool ends, and a pivotal door with a spring-urged member for pushing against a second one of the exposed spool ends for urging the first exposed spool end onto the spindle when the door is pivoted closed, is characterized by:

a rigid member of the pivotal door for pushing against the shell, but not against the second exposed spool end, to move the cartridge initially into the chamber toward the spindle before the spring-urged member can push against the second exposed spool end when the door is pivoted closed.

2. The camera of claim 1, wherein said spring-urged member urges the first exposed spool end onto the spindle sufficiently to separate the shell from said rigid member when the door is pivoted closed.

3. The camera of claim 2, wherein said spring-urged member is spring-urged to move away from said door, and said rigid member is engageable with the spring-urged member to limit movement of the spring-urged member away from the door.

4. The camera of claim 1, wherein said spring-urged member is spring-urged to move away from said door, and said rigid member is engageable with the spring-urged member to limit movement of the spring-urged member away from the door.

5. The camera of claim 1, wherein said cartridge includes a light lock movable between an open position, allowing a photographic filmstrip to exit the shell, and a closed position sealing the shell in a light-tight manner, the cartridge further including a locking member movable between a locked position for preventing the light lock from moving between the open and closed positions and an unlocked position for allowing the light lock to move between the open and closed positions, said camera including a driving member, engageable with said light lock, for moving the light lock between the open and closed positions, said rigid member moving the cartridge into the chamber such that said locking member is moved from said locked position to said unlocked position by engagement with said drive member.

6. The camera of claim 2, wherein said cartridge includes a light lock movable between an open position, allowing a photographic filmstrip to exit the shell, and a closed position sealing the shell in a light-tight manner, the cartridge further including a locking member movable between a locked position for preventing the light lock from moving between the open and .closed positions and an unlocked position for allowing the light lock to move between the open and closed positions, said camera including a driving member, engageable with said light lock, for moving the light lock between the open and closed positions, said rigid member moving the cartridge into the chamber such that said locking member is moved from said locked position to said unlocked position by engagement with said drive member.

7. The camera of claim 3, wherein said cartridge includes a light lock movable between an open position, allowing a photographic filmstrip to exit the shell, and a closed position sealing the shell in a light-tight manner, the cartridge further including a locking member movable between a locked position for preventing the light lock from moving between the open and closed positions and an unlocked position for allowing the light lock to move between the open and closed positions, said camera including a driving member, engageable with said light lock, for moving the light lock between the open and closed positions, said rigid member moving the cartridge into the chamber such that said locking member is moved from said locked position to said unlocked position by engagement with said drive member.

8. The camera of claim 4, wherein said cartridge includes a light lock movable between an open position, allowing a photographic filmstrip to exit the shell, and a closed position sealing the shell in a light-tight manner, the cartridge further including a locking member movable between a locked position for preventing the light lock from moving between the open and closed positions and an unlocked position for allowing the light lock to move between the open and closed positions, said camera including a driving member, engageable with said light lock, for moving the light lock between the open and closed positions, said rigid member moving the cartridge into the chamber such that said locking member is moved from said locked position to said unlocked position by engagement with said drive member.

9. The camera of claim 1, wherein a portion of said rigid member which first pushes against the shell is closer to a pivot axis of said pivotal door than said spring-urged member, thereby enhancing a camera user's leverage in closing said pivotal door.

* * * * *